(12) United States Patent
Tennant

(10) Patent No.: US 11,778,997 B1
(45) Date of Patent: Oct. 10, 2023

(54) FISHING LINE SPOOLING ASSEMBLY

(71) Applicant: Steve Tennant, Manti, UT (US)

(72) Inventor: Steve Tennant, Manti, UT (US)

(*) Notice: Subject to any disclaimer, the term of this patent is extended or adjusted under 35 U.S.C. 154(b) by 0 days.

(21) Appl. No.: 17/881,159

(22) Filed: Aug. 4, 2022

(51) Int. Cl.
*A01K 89/01* (2006.01)
*A01K 89/00* (2006.01)

(52) U.S. Cl.
CPC .................. *A01K 89/003* (2013.01)

(58) Field of Classification Search
CPC ...... A01K 89/003; B65H 54/02; B65H 54/70; B65H 54/72; B65H 57/00; B65H 75/02; B65H 75/18
See application file for complete search history.

(56) References Cited

U.S. PATENT DOCUMENTS

| | | | |
|---|---|---|---|
| 2,048,307 A | 7/1936 | Weber | |
| 2,132,698 A * | 10/1938 | Price | B65H 54/72 242/487 |
| 2,841,343 A * | 7/1958 | Dorman | B65H 49/32 242/571 |
| 3,679,151 A | 6/1972 | Rice | |
| 4,540,136 A | 9/1985 | Rauch | |
| 4,588,139 A * | 5/1986 | Lines | A01K 89/003 242/570 |
| 4,795,107 A * | 1/1989 | Williams | A01K 89/003 242/321 |
| 4,948,059 A * | 8/1990 | Lewitt | B65H 59/04 242/129.6 |
| D335,524 S | 5/1993 | Dillashaw | |
| 5,209,423 A * | 5/1993 | Barginear | B65H 49/32 242/598.5 |
| 5,551,645 A * | 9/1996 | Torvund | B65H 59/04 242/395 |
| 5,906,329 A * | 5/1999 | Wesley, Sr. | A01K 89/003 242/390.8 |
| 7,303,164 B1 | 12/2007 | Reno | |
| 2004/0031877 A1* | 2/2004 | Smith, Jr. | B65H 49/322 242/588.4 |
| 2008/0315026 A1* | 12/2008 | Sleeper | A01K 89/003 242/400 |
| 2012/0205480 A1* | 8/2012 | Harnage | B65H 59/04 242/422.1 |
| 2013/0264407 A1* | 10/2013 | Mcleod | A01K 97/06 242/310 |
| 2016/0183507 A1* | 6/2016 | Morehead | A01K 91/06 242/533 |
| 2019/0075771 A1* | 3/2019 | Gordon | A01K 89/01912 |

FOREIGN PATENT DOCUMENTS

CN 109956363 A * 7/2019

* cited by examiner

*Primary Examiner* — Emmanuel M Marcelo

(57) ABSTRACT

A fishing line spooling assembly includes a bracket that can be positioned on a support surface and a pair of panels attached to the bracket. A first screw is extendable through each of the panels to rotatably retain a spool of fishing line between the panels. A window is slidable into each of the panels such that the window defines a front threshold of a spool space defined between the panels. The window has a line hole extending through the window thereby facilitating fishing line on the spool of fishing line to be extended through the line hole thereby facilitating the fishing line to be wound around a reel of a fishing pole. A pair of second screws is each coupled to and extends upwardly from the lower portion of the bracket thereby facilitating a respective spool of fishing line positioned on the second screws for storage.

14 Claims, 7 Drawing Sheets

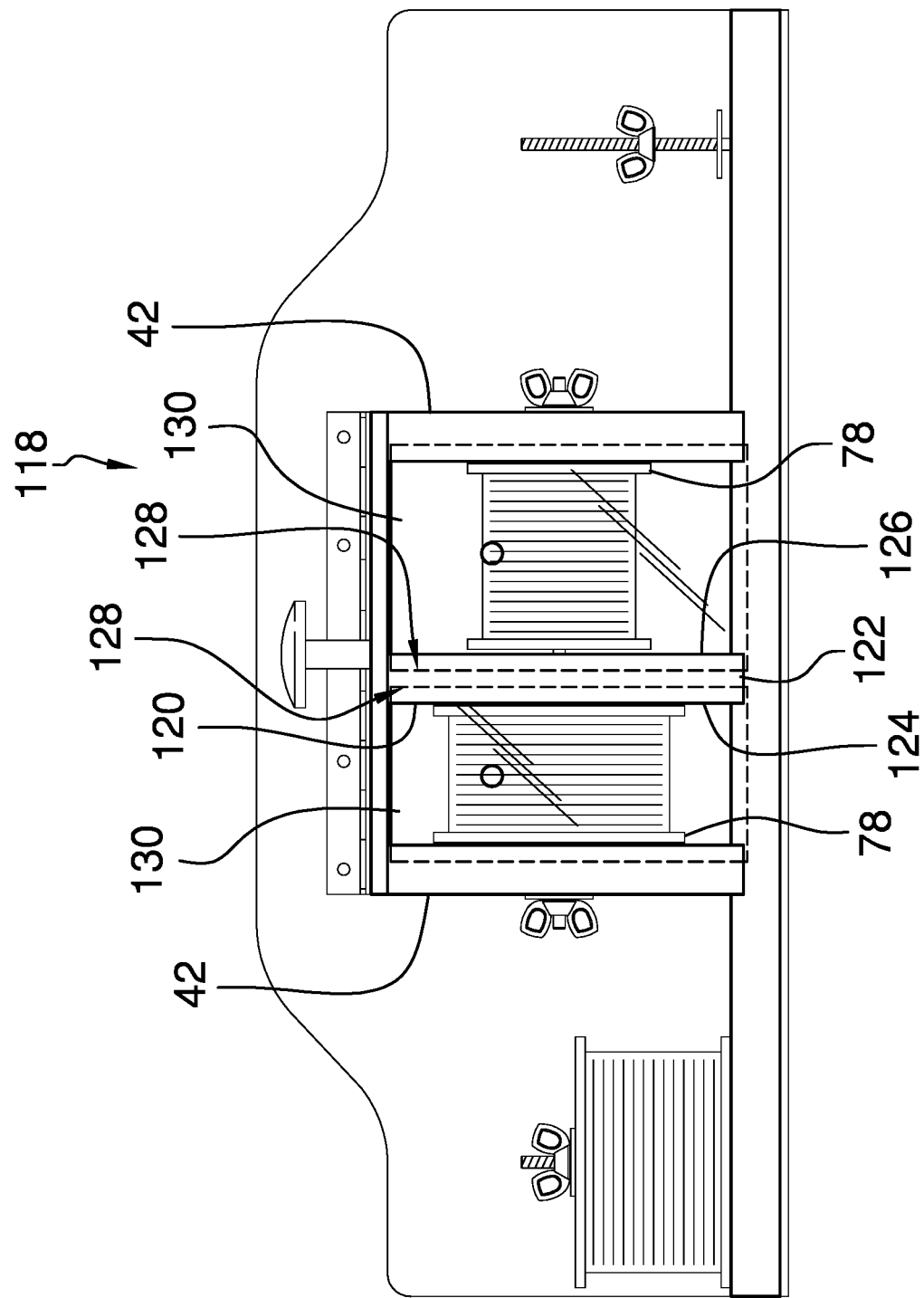

FISHING LINE SPOOLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishing line devices and more particularly pertains to a new fishing line device for spooling fishing line on a reel of a fishing rod. The device includes a bracket that is positionable on a support surface and a pair of panels each attached to the bracket to define a spool space between the panels. A window is provided that is slidable between the panels to define a front threshold of the spool space. A screw is extendable through the panels to support a spool of fishing line. The fishing line is extendable through a line hole in the window to facilitate the fishing line to be wrapped around a reel on a fishing pole.

(2) Description of Related Art Including Information Disclosed Under 37 CFR 1.97 and 1.98

The prior art relates to fishing line devices including a box for holding a spool of fishing line in a rotatable fashion. The prior art discloses a variety of fishing line devices that are mountable to a fishing pole for holding a spool of fishing line. The prior art discloses a variety of fishing line holders that include a pair of panels spaced apart from each other and a shaft extendable through the panels for supporting a spool of fishing line. The prior art discloses a box for rotatably holding a spool of fishing line.

BRIEF SUMMARY OF THE INVENTION

An embodiment of the disclosure meets the needs presented above by generally comprising a bracket that can be positioned on a support surface and a pair of panels attached to the bracket. A first screw is extendable through each of the panels to rotatably retain a spool of fishing line between the panels. A window is slidable into each of the panels such that the window defines a front threshold of a spool space defined between the panels. The window has a line hole extending through the window thereby facilitating fishing line on the spool of fishing line to be extended through the line hole thereby facilitating the fishing line to be wound around a reel of a fishing pole. A pair of second screws is each coupled to and extends upwardly from the lower portion of the bracket thereby facilitating a respective spool of fishing line positioned on the second screws for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is a front view of an alternative embodiment of the disclosure.

DETAILED DESCRIPTION OF THE INVENTION

Figure 1:
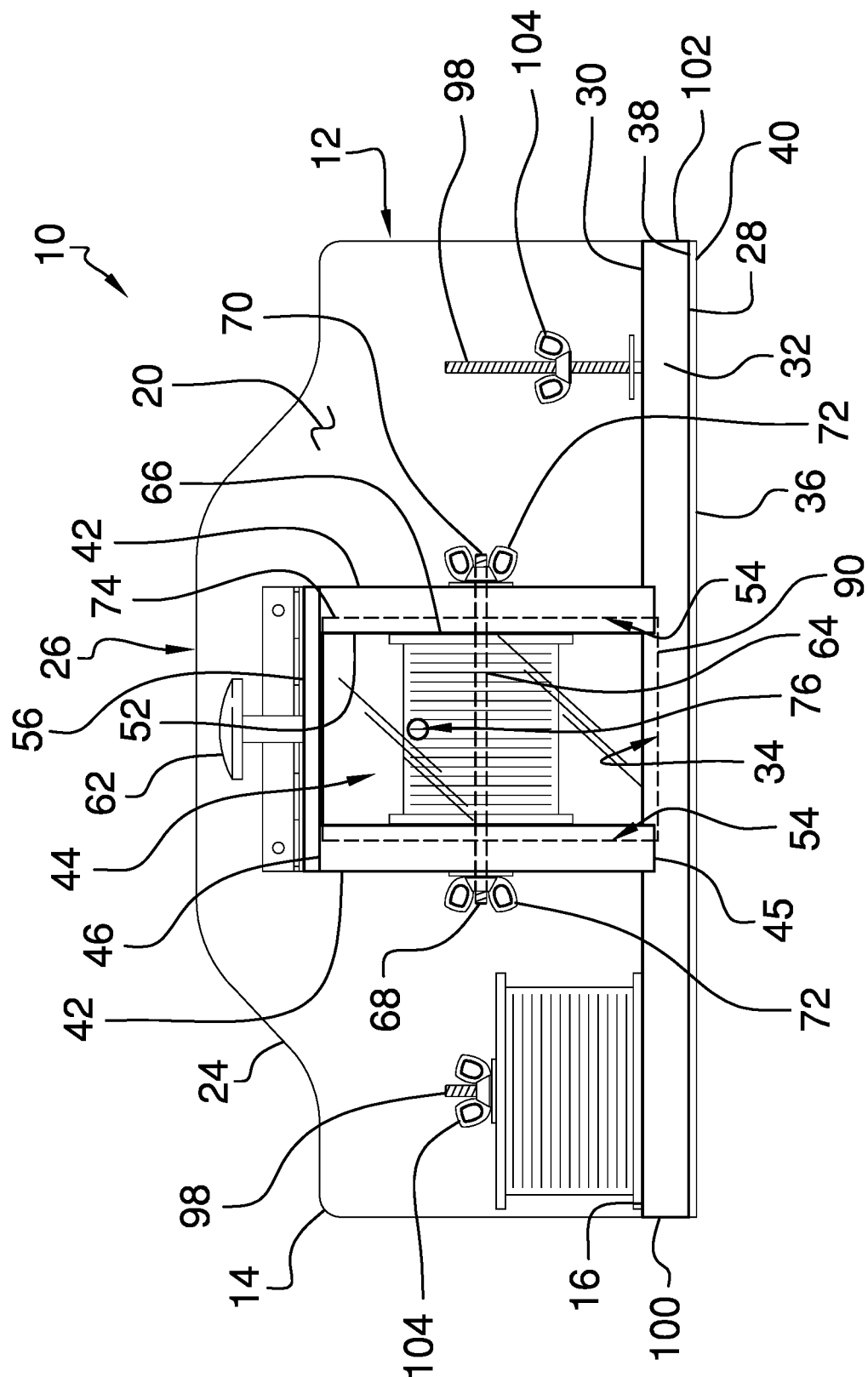
FIG. 1 is a front view of a fishing line spooling assembly according to an embodiment of the disclosure.
Figure 2:
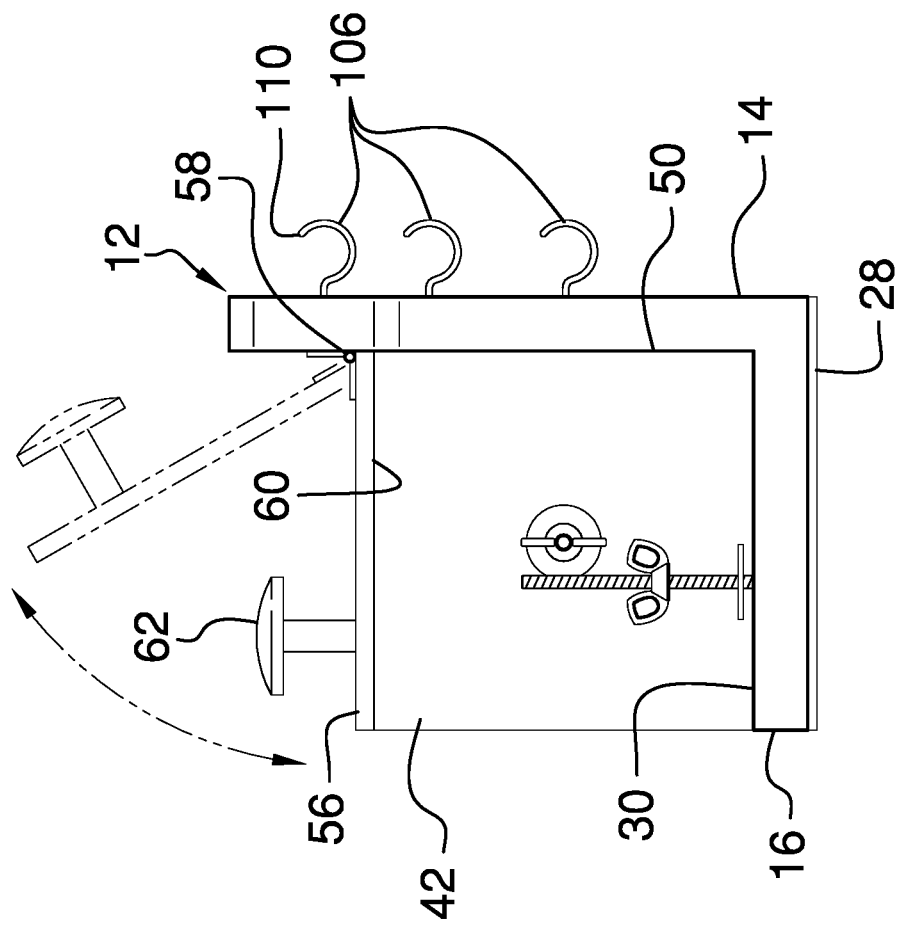
FIG. 2 is a left side view of an embodiment of the disclosure.
Figure 3:
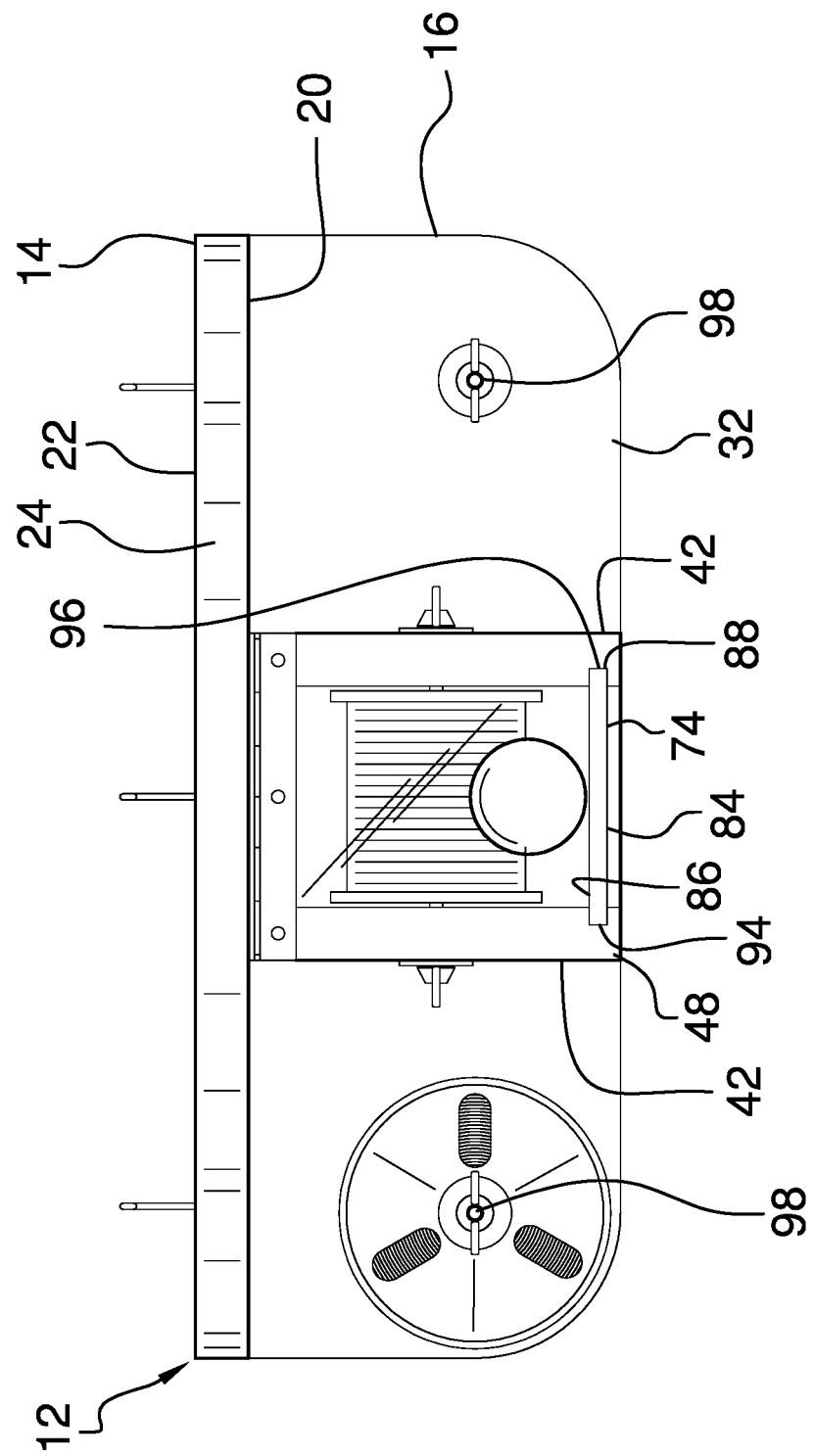
FIG. 3 is a top view of an embodiment of the disclosure.
Figure 4:
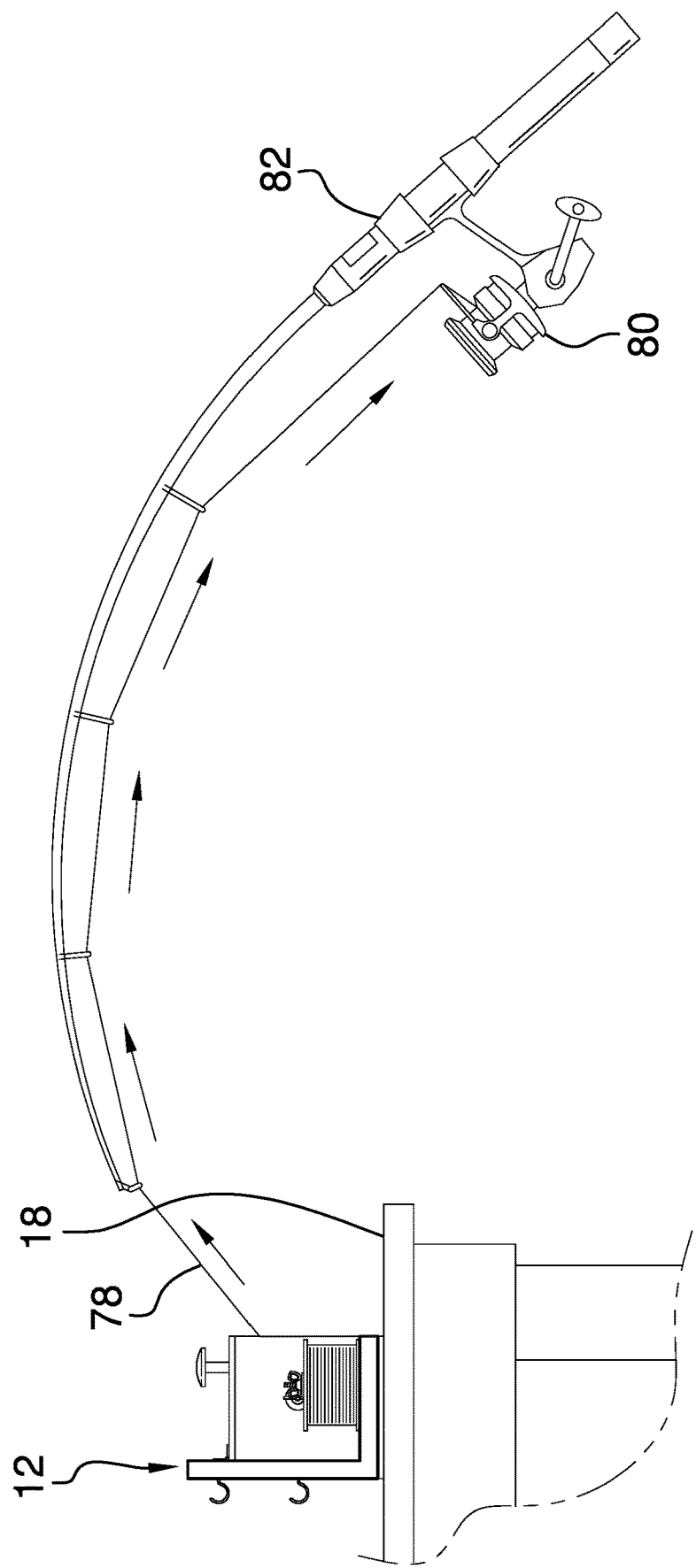
FIG. 4 is a perspective in-use view of an embodiment of the disclosure.
Figure 5:
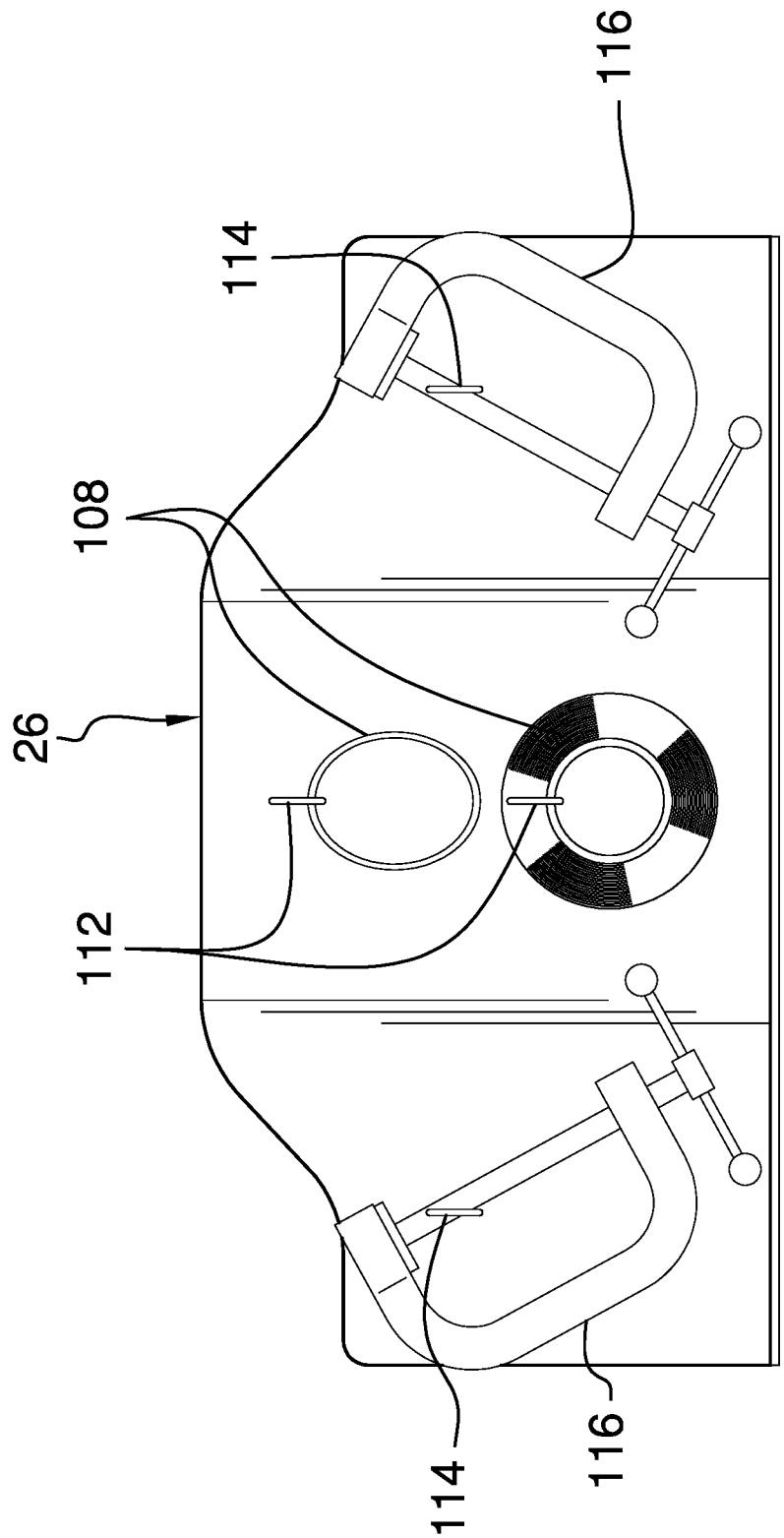
FIG. 5 is a back view of an embodiment of the disclosure.
Figure 6:
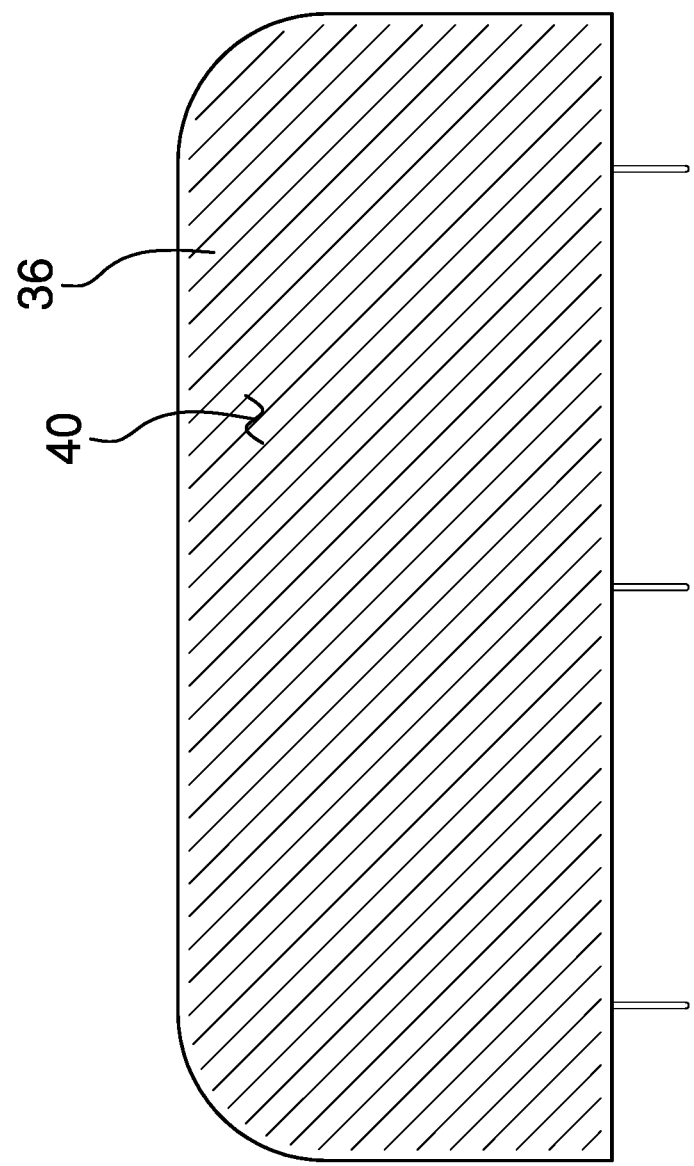
FIG. 6 is a bottom view of an embodiment of the disclosure.

With reference now to the drawings, and in particular to FIGS. 1 through 7 thereof, a new fishing line device embodying the principles and concepts of an embodiment of the disclosure and generally designated by the reference numeral 10 will be described.

As best illustrated in FIGS. 1 through 7, the fishing line spooling assembly 10 generally comprises a bracket 12 that has a rear portion 14 forming an angle with a lower portion 16 thereby facilitating the lower portion 16 to be positioned on a support surface 18 having the rear portion 14 being vertically oriented. The support surface 18 may be a table top, a floor or any other horizontal support surface 18. The rear portion 14 has a front surface 20, a back surface 22 and a top edge 24, and the top edge 24 has a prominence 26 that is centrally positioned on the top edge 24 for enhancing an ornamental appearance of the top edge 24. The lower portion 16 has a bottom surface 28, an upper surface 30 and a front edge 32 extending between the bottom surface 28 and the upper surface 30. The lower portion 16 has a first groove 34 extending into the upper surface 30, the first groove 34 extends along a line that is oriented parallel to the front edge 32 and the first groove 34 is spaced from the front edge 32.

A pad 36 is included that has an upper surface 38 and a lower surface 40, and the upper surface 38 of the pad 36 is bonded to the bottom surface 28 of the lower portion 16 of the bracket 12 thereby facilitating the pad 36 to abut the support surface 18 when the bracket 12 is positioned on the support surface 18. The pad 36 is comprised of a friction enhancing material, including but not being limited to rubber, such that the pad 36 inhibits the bracket 12 from sliding on the support surface 18. Additionally, the pad 36 covers a substantial area of the bottom surface 28 of the lower portion 16. The lower surface 40 of the pad 36 may be textured to enhance the ability of the pad 36 to frictionally engage the support surface 18.

A pair of panels 42 is provided and each of the panels 42 is attached to the lower portion 16 of the bracket 12. The panels 42 are spaced apart from each other to define a spool space 44 between the panels 42. Each of the panels 42 has a bottom edge 45, a top edge 46, a front edge 48, a rear edge 50 and a first surface 52. The bottom edge 45 of each of the panels 42 is coupled to the upper surface 30 of the lower portion 16 and the rear edge 50 is coupled to the front surface 20 of the rear portion 14 of the bracket 12. Additionally, each of the panels 42 is spaced apart from a center of the lower portion 16. Each of the panels 42 has a second groove 54 extending into the first surface 52 of the panels 42. The second groove 54 on each of the panels 42 extends between the bottom edge 45 and the top edge 46 of a respective panel 42. Additionally, the second groove 54 on each of the panels 42 is spaced from the front edge 46 of the respective panel 42.

A lid 56 is hingedly coupled to the pair of panels 42 such that the lid 56 closes the spool space 44 when the lid 56 is positioned in a closed position. The lid 56 has a rear edge 58 and a lowermost surface 60, and the rear edge 58 of the lid 56 is hingedly coupled to the top edge 46 of each of the panels 42 at a point located at an intersection between the top edge 46 of the panels 42 and the front surface 20 of the rear portion 14 of the bracket 12. Additionally, the lowermost surface 60 rests upon the top edge 46 of the panels 42 when the lid 56 is closed. A knob 62 is coupled to and extends upwardly from the lid 56 thereby facilitating the knob 62 to be gripped for opening and closing the lid 56.

A first screw 64 is extendable through each of the panels 42 thereby facilitating the first screw 64 to rotatably retain a spool of fishing line 66 in the spool space 44. The spool of fishing line 66 may be any type of fishing line 78 that would commonly be employed on a fishing pole 82. The first screw 64 has a first end 68 and a second end 70, and each of the first end 68 and the second end 70 is exposed when the first screw 64 is extended through the pair of panels 42. A pair of first nuts 72 is each threadable onto a respective first end 68 and second end 70 of the first screw 64 for securing the first screw 64 in the pair of panels 42.

A window 74 is slidable into each of the panels 42 such that the window 74 defines a front threshold of the spool space 44 defined between the panels 42. The window 74 has a line hole 76 extending through the window 74 thereby facilitating fishing line 78 on the spool of fishing line 66 to be extended through the line hole 76 to facilitate the fishing line 78 to be wound around a reel 80 of a fishing pole 82. The window 74 has a forward surface 84, a rear surface 86 and an outer edge 88 extending between the forward surface 84 and the rear surface 86. The outer edge 88 has a lower side 90, an upper side 92, a first lateral side 94 and a second lateral side 96. Furthermore, the line hole 76 extends through the forward surface 84 and the rear surface 86.

Each of the first lateral side 94 and the second lateral side 96 of the outer edge 88 of the window 74 is positioned in the second groove 54 in a respective one of the panels 42. The lower side 90 is positioned in the first groove 34 in the upper surface 30 of the lower portion 16 of the bracket 12 when the window 74 is fully seated. The line hole 76 is aligned with a central axis of the window 74 which extends between the lower side 90 and the upper side 92. Furthermore, the line hole 76 is positioned closer to the upper side 92 than the lower side 90 such that the fishing line 78 angles upwardly between the spool of fishing line 66 and the line hole 76 when the fishing line 78 is extended through the line hole 76.

A pair of second screws 98 is each coupled to and extends upwardly from the lower portion 16 of the bracket 12 thereby facilitating each of the second screws 98 to have a respective spool of fishing line 66 positioned on the second screws 98 for storage. Each of the second screws 98 extends upwardly from the upper surface 30 of the lower portion 16. Additionally, each of the second screws 98 is positioned between a respective one of the panels 42 and a respective one of a first lateral edge 100 and a second lateral edge 102 of the lower portion 16 of the bracket 12. A pair of second nuts 104 is each threadable onto a respective one of the second screws 98 when the respective spool of fishing line 66 is positioned on the respective second screw 98 for retaining the respective spool of fishing line 66 on the respective second screw 98.

A plurality of hooks 106 is each attached to the back surface 22 of the rear portion 14 of the bracket 12 thereby facilitating each of the hooks 106 to support a respective tool 108. Each of the hooks 106 has a distal end 110 with respect to the back surface 22 of the rear portion 14. Additionally, each of the hooks 106 curves upwardly between the back surface 22 and the distal end 110. The hooks 106 are spaced apart from each other and are strategically positioned on the back surface 22. The plurality of hooks 106 includes a set of first hooks 112 that are vertically distributed on the rear portion 14 and which are centrally located on the rear portion 14. The plurality of hooks 106 includes a set of second hooks 114 that are each positioned adjacent to opposing ends of the rear portion 14. As is most clearly shown in FIG. 5, a pair of C-clamps 116 may be suspended from the second hooks 114 that can be employed to secure the bracket 12 to the support surface 18.

In an alternative embodiment 118 as is most clearly shown in FIG. 7, a partition 120 is provided that has a lower edge 122, a first lateral surface 124 and a second lateral surface 126, and the lower edge 122 of the partition 120 is coupled to the upper surface of the lower portion 16. The partition 120 is positioned between the pair of panels 42 to define a pair of spool spaces 44 between the partition 120 and a respective one of the panels 42. In this way a pair of spools of fishing lines 78 can each be positioned in a respective one of the spool spaces 44. The partition 120 has a pair of third grooves 128 each integrated into a respective one of the first lateral surface 124 and the second lateral surface 126. Continuing in the alternative embodiment 118, a pair of windows 130 is provided and each of the windows 130 is insertable into the second groove 54 in a respective panel 42 and a respective third groove 128 in the partition 120.

In use, the lower portion 16 of the bracket 12 is positioned on the support surface 18 and the spool of fishing line 66 is positioned in the spool space 44 and the first screw 64 is extended through the pair of panels 42 to rotatably suspend the spool of fishing line 66 in the spool space 44. Additionally, the spool of fishing line 66 is oriented such that the fishing line 78 pulls off of the spool of fishing line 66 from beneath the spool of fishing line 66. The window 74 is inserted into the second groove 54 in each of the panels 42 and into the first groove 34 in the upper surface 30 of the lower portion 16. Additionally, the fishing line 78 is extended through the line hole 76 in the window 74 and the fishing line 78 is routed through eyelets 132 of the fishing pole 82 and secured to the reel 80 on the fishing pole 82. The reel 80 is manipulated to wrap the fishing line 78 around the reel 80 and the fishing pole 82 is oriented to maintain tension on the fishing line 78. In this way fishing line 78 can be wrapped around the reel 80 without tangles and knots developing in the fishing line 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing line spooling assembly for facilitating fishing line to be spooled onto a fishing reel, said assembly comprising:
a bracket having a rear portion forming an angle with a lower portion thereby facilitating said lower portion to be positioned on a support surface having said rear portion being vertically oriented;
a pair of panels, each of said panels being attached to said lower portion of said bracket, said panels being spaced apart from each other to define a spool space between said panels;
a lid being hingedly coupled to said pair of panels such that said lid closes said spool space when said lid is positioned in a closed position;
a first screw being extendable through each of said panels thereby facilitating said first screw to rotatably retain a spool of fishing line in said spool space;
a window being slidable into each of said panels such that said window defines a front threshold of said spool space defined between said panels, said window having a line hole extending through said window thereby facilitating fishing line on the spool of fishing line to be extended through said line hole thereby facilitating the fishing line to be wound around a reel of a fishing pole; and
a pair of second screws, each of said second screws being coupled to and extending upwardly from said lower portion of said bracket thereby facilitating each of said second screws to have a respective spool of fishing line positioned on said second screws for storage.

2. The assembly according to claim 1, wherein said rear portion has a front surface, a back surface and a top edge, said top edge having a prominence being centrally positioned on said top edge for enhancing an ornamental appearance of said top edge, said lower portion having a bottom surface and an upper surface and a front edge extending between said bottom surface and said upper surface, said lower portion having a first groove extending into said upper surface, said first groove being extending along a line being oriented parallel to said front edge, said first groove being spaced from said front edge.

3. The assembly according to claim 2, further comprising a pad having an upper surface and a lower surface, said upper surface of said pad being bonded to said bottom surface of said lower portion of said bracket thereby facilitating said pad to abut the support surface when said bracket is positioned on the support surface, said pad being comprised of a friction enhancing material such that said pad inhibits said bracket from sliding on the support surface, said pad covering a substantial area of said bottom surface of said lower portion.

4. The assembly according to claim 2, wherein each of said panels has a bottom edge and a top edge and a front edge and a rear edge and a first surface, said bottom edge of each of said panels being coupled to said upper surface of said lower portion, said rear edge being coupled to said front surface of said rear portion of said bracket, each of said panels being spaced apart from a center of said lower portion.

5. The assembly according to claim 4, wherein each of said panels has a second groove extending into said first surface of said panels, said second groove on each of said panels extending between said bottom edge and said top edge of a respective panel, said second groove on each of said panels being spaced from said front edge of said respective panel.

6. The assembly according to claim 5, wherein:
said window has a forward surface and a rear surface and an outer edge extending between said forward surface and said rear surface, said outer edge having a lower side, an upper side, a first lateral side and a second lateral side;
said line hole extends through said forward surface and said rear surface;
each of said first lateral side and said second lateral side being positioned in said second groove in a respective one of said panels; and
said lower side being positioned in said first groove in said upper surface of said lower portion of said bracket when said window is fully seated.

7. The assembly according to claim 6, wherein said line hole is aligned with a central axis of said window which extends between said lower side and said upper side, said line hole being positioned closer to said upper side than said lower side such that the fishing line angles upwardly between the spool of fishing line and said line hole when the fishing line is extended through said line hole.

8. The assembly according to claim 4, wherein said lid has a rear edge and a lowermost surface, said rear edge of said lid being hingedly coupled to said top edge of each of said panels at a point located at an intersection between said top edge of said panels and said front surface of said rear portion of said bracket, said lowermost surface resting upon said top edge of said panels when said lid is closed.

9. The assembly according to claim 2, wherein:
each of said second screws extends upwardly from said upper surface of said lower portion, each of said second screws being positioned between a respective one of said panels and a respective one of a first lateral edge and a second lateral edge of said lower portion of said bracket; and
said assembly includes a pair of second nuts, each of said second nuts being threadable onto a respective one of said second screws when the respective spool of fishing line is positioned on said respective second screw for retaining the respective spool of fishing line on said respective second screw.

10. The assembly according to claim 2, further comprising a plurality of hooks, each of said hooks being attached to said back surface of said rear portion of said bracket thereby facilitating each of said hooks to support a respective tool, each of said hooks having a distal end with respect to said back surface of said rear portion, each of said hooks curving upwardly between said back surface and said distal end, said hooks being spaced apart from each other and strategically positioned on said back surface.

11. The assembly according to claim 1, wherein:
said first screw has a first end and a second end, each of said first end and said second end being exposed when said first screw is extended through said pair of panels; and
a pair of first nuts, each of said first nuts being threadable onto a respective first end and second end of said first screw for securing said first screw in said pair of panels.

12. A fishing line spooling assembly for facilitating fishing line to be spooled onto a fishing reel, said assembly comprising:
a bracket having a rear portion forming an angle with a lower portion thereby facilitating said lower portion to be positioned on a support surface having said rear portion being vertically oriented, said rear portion having a front surface, a back surface and a top edge, said top edge having a prominence being centrally positioned on said top edge for enhancing an ornamental appearance of said top edge, said lower portion having a bottom surface and an upper surface and a front edge extending between said bottom surface and said upper surface, said lower portion having a first groove extending into said upper surface, said first groove being extending along a line being oriented parallel to said front edge, said first groove being spaced from said front edge;
a pad having an upper surface and a lower surface, said upper surface of said pad being bonded to said bottom surface of said lower portion of said bracket thereby facilitating said pad to abut the support surface when said bracket is positioned on the support surface, said pad being comprised of a friction enhancing material such that said pad inhibits said bracket from sliding on the support surface, said pad covering a substantial area of said bottom surface of said lower portion;
a pair of panels, each of said panels being attached to said lower portion of said bracket, said panels being spaced apart from each other to define a spool space between said panels, each of said panels having a bottom edge and a top edge and a front edge and a rear edge and a first surface, said bottom edge of each of said panels being coupled to said upper surface of said lower portion, said rear edge being coupled to said front surface of said rear portion of said bracket, each of said panels being spaced apart from a center of said lower portion, each of said panels having a second groove extending into said first surface of said panels, said second groove on each of said panels extending between said bottom edge and said top edge of a respective panel, said second groove on each of said panels being spaced from said front edge of said respective panel;
a lid being hingedly coupled to said pair of panels such that said lid closes said spool space when said lid is positioned in a closed position, said lid having a rear edge and a lowermost surface, said rear edge of said lid being hingedly coupled to said top edge of each of said panels at a point located at an intersection between said top edge of said panels and said front surface of said rear portion of said bracket, said lowermost surface resting upon said top edge of said panels when said lid is closed;
a knob being coupled to and extending upwardly from said lid thereby facilitating said knob to be gripped for opening and closing said lid;
a first screw being extendable through each of said panels thereby facilitating said first screw to rotatably retain a spool of fishing line in said spool space, said first screw having a first end and a second end, each of said first end and said second end being exposed when said first screw is extended through said pair of panels;
a pair of first nuts, each of said first nuts being threadable onto a respective first end and second end of said first screw for securing said first screw in said pair of panels;
a window being slidable into each of said panels such that said window defines a front threshold of said spool space defined between said panels, said window having a line hole extending through said window thereby facilitating fishing line on the spool of fishing line to be extended through said line hole thereby facilitating the fishing line to be wound around a reel of a fishing pole, said window having a forward surface and a rear surface and an outer edge extending between said forward surface and said rear surface, said outer edge having a lower side, an upper side, a first lateral side and a second lateral side, said line hole extending through said forward surface and said rear surface, each of said first lateral side and said second lateral side being positioned in said second groove in a respective one of said panels, said lower side being positioned in said first groove in said upper surface of said lower portion of said bracket when said window is fully seated, said line hole being aligned with a central axis of said window which extends between said lower side and said upper side, said line hole being positioned closer to said upper side than said lower side such that the fishing line angles upwardly between the spool of fishing line and said line hole when the fishing line is extended through said line hole;
a pair of second screws, each of said second screws being coupled to and extending upwardly from said lower portion of said bracket thereby facilitating each of said second screws to have a respective spool of fishing line positioned on said second screws for storage, each of said second screws extending upwardly from said upper surface of said lower portion, each of said second screws being positioned between a respective one of said panels and a respective one of a first lateral edge and a second lateral edge of said lower portion of said bracket;
a pair of second nuts, each of said second nuts being threadable onto a respective one of said second screws when the respective spool of fishing line is positioned on said respective second screw for retaining the respective spool of fishing line on said respective second screw; and a plurality of hooks, each of said hooks being attached to said back surface of said rear portion of said bracket thereby facilitating each of said hooks to support a respective tool, each of said hooks having a distal end with respect to said back surface of said rear portion, each of said hooks curving upwardly between said back surface and said distal end, said hooks being spaced apart from each other and strategically positioned on said back surface.

13. The assembly according to claim 12, further comprising a partition having a lower edge, a first lateral surface and a second lateral surface, said lower edge being coupled to said upper surface of said lower portion, said partition being positioned between said pair of panels to define a pair of spool spaces between said partition and a respective one of said panels, said partition having a pair of third grooves each being integrated into a respective one of said first lateral surface and said second lateral surface.

14. The assembly according to claim 13, further comprising a pair of windows, each of said windows being insertable into said second groove in a respective panel and a respective third groove in said partition.

\* \* \* \* \*